United States Patent
Kim et al.

(10) Patent No.: US 12,457,668 B2
(45) Date of Patent: Oct. 28, 2025

(54) ELECTRIC RANGE

(71) Applicant: LG ELECTRONICS INC., Seoul (KR)

(72) Inventors: Seunghak Kim, Seoul (KR); Junghyeon Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 806 days.

(21) Appl. No.: 17/826,554

(22) Filed: May 27, 2022

(65) Prior Publication Data

US 2022/0386427 A1 Dec. 1, 2022

(30) Foreign Application Priority Data

May 28, 2021 (KR) .................. 10-2021-0069397

(51) Int. Cl.
*H05B 6/12* (2006.01)
*F24C 7/08* (2006.01)

(52) U.S. Cl.
CPC ........... *H05B 6/1209* (2013.01); *F24C 7/083* (2013.01); *H05B 2206/022* (2013.01)

(58) Field of Classification Search
CPC ..... H05B 6/1245; H05B 6/1209; F24C 15/08; F24C 7/083; F24C 15/104
See application file for complete search history.

(56) References Cited

U.S. PATENT DOCUMENTS

2015/0114953 A1* 4/2015 Suzuki ................. H05B 6/1263
219/620

FOREIGN PATENT DOCUMENTS

| EP | 2 981 155 | | 2/2016 | |
|---|---|---|---|---|
| EP | 3 048 860 | | 7/2016 | |
| EP | 4008964 | A1 * | 6/2022 | ............ F24C 15/104 |
| JP | 2006105454 | A * | 4/2006 | |
| WO | WO 2019/065251 | | 4/2019 | |

OTHER PUBLICATIONS

European Search Report dated Oct. 21, 2022 issued in EP Application No. 22175990.5.

* cited by examiner

*Primary Examiner* — Thien S Tran
(74) *Attorney, Agent, or Firm* — KED & ASSOCIATES

(57) ABSTRACT

An electric range is provided that may include a lower casing defining a lower portion of a case that is formed in two steps. In particular, the lower casing may include a first lower part; a second lower part recessed from an inside of the first lower part, and to which a bracket is coupled; and a third lower part that protrudes from at least a predetermined area of a portion of the first lower part.

18 Claims, 11 Drawing Sheets

ELECTRIC RANGE

CROSS-REFERENCE TO RELATED APPLICATION(S)

This application claims priority to and benefit of Korean Patent Application No. 10-2021-0069397, filed in Korea on May 28, 2021, which is hereby incorporated by reference as when fully set forth herein.

BACKGROUND

1. Field

An electric range is disclosed herein.

2. Background

Various types of cooking utensils and electric appliances are used to heat food or other items (hereinafter, collectively "food") at home or in restaurants. Cooking appliances includes a gas range using gas and an electric range using electricity.

An electric range is largely divided into a resistance heating type and an induction heating type. An electrical resistance type may generate heat by applying an electric current to a non-metallic heating element such as a metal resistance wire and silicon carbide, and may heat an object, for example, a cooking vessel or container, such as a pot or a frying fan, by radiating or conducting the generated heat. An induction heating type may apply high-frequency power to a coil and generate a magnetic field around the coil, and may heat a heating object made of a metal material using an eddy current generated in the magnetic field.

A basic heating principle of an induction heating method will be described. When an electric current is applied to a working coil or a heating coil, a heating object may be induction-heated to generate heat and the heating object may be heated by the generated heat. In order to appeal to customers, a design of a recent electric range is developing to be a slim structure with a low height, that is, a small length in a vertical direction. A power supply wire (i.e., a cable) may be provided in the electric range to supply power.

FIG. 1 partially shows a shape of a conventional electric range. Referring to FIG. 1, a conventional electric range may include a case configured of a lower casing 110 and a side casing 120. A wire connection hole 122 may be formed at a connecting portion between the lower casing 110 and the side casing 120. A wire for power supply (or an electric power supply wire) may be disposed to penetrate from an outer area and to an inner area of the case 110 and 120 through the wire connection hole 122.

A wire clamp 220 may be disposed in the inner area of the case 110 and 120 to secure the electric power supply wire. The wire clamp 240 may be disposed adjacent to a terminal block 240. The terminal block 240 may be configured to supply an external electric power to a printed circuit board (PCB).

A connection member 140 may be provided in the lower casing 110 to secure the wire clamp 220 and the terminal block 240 to the case 110 and 120. The connection member 140 may have a shape that is spaced upwardly from the lower casing 110, and may be fastened to the wire clamp 220 and the terminal block 240 by a screw. A lower portion of the screw, that is, unfastened portion of the screw, may protrude to a lower surface of the connection member 140 so that the lower portion of the screw may not protrude to the lower casing 110.

However, when the connection member 140 is provided, additional component costs may be generated and a manufacturer has to directly install the connection member 140 in the lower case 110, thereby causing a problem of high labor costs.

BRIEF DESCRIPTION OF THE DRAWINGS

Embodiments will be described in detail with reference to the following drawings in which like reference numerals refer to like elements, and wherein.

DETAILED DESCRIPTION

Figure 1:
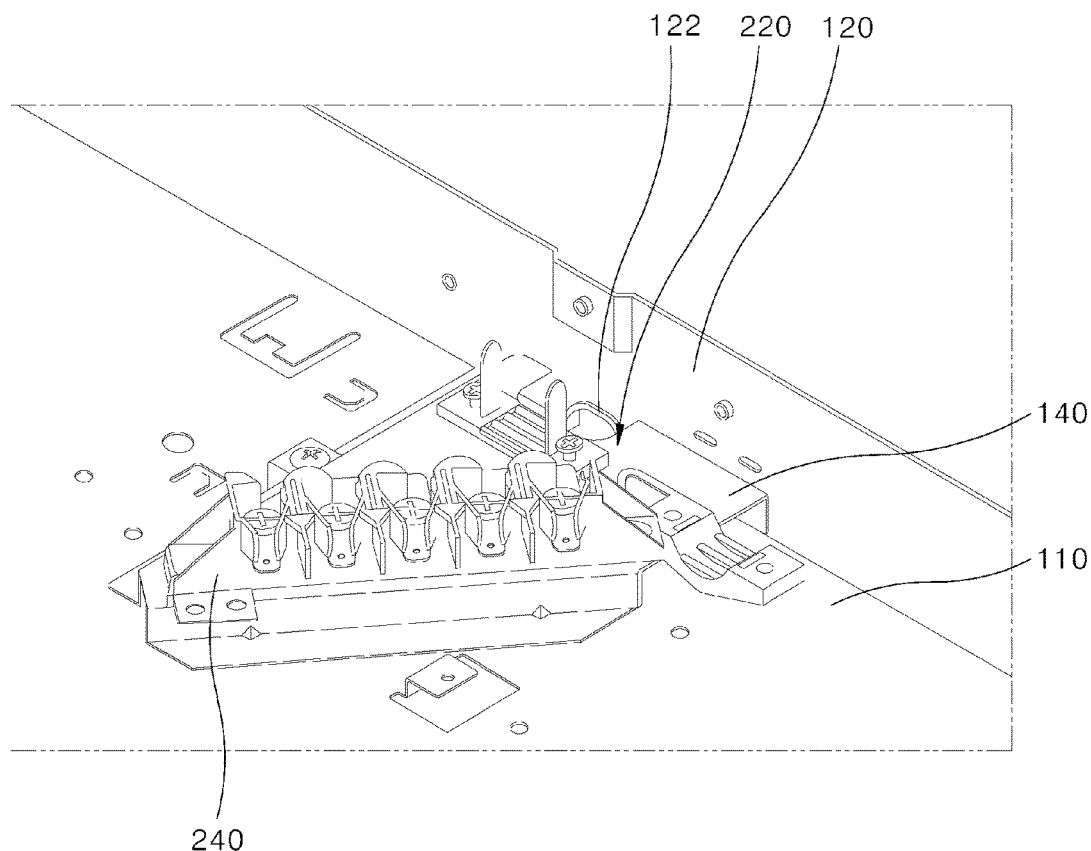
FIG. 1 partially shows a conventional electric range.

Aspects, features, and advantages are described hereunder with reference to the accompanying drawings such that one having ordinary skill in the art to which the embodiments pertain can easily implement the technical spirit. In the disclosure, detailed descriptions of known technologies are omitted if they are deemed to make the gist unnecessarily vague. Hereinafter, embodiments are described with reference to the accompanying drawings. In the drawings, identical reference numerals can denote identical or similar components.

The terms "first" and "second", for example, are used herein only to distinguish one component from another component. Thus, the components should not be limited by the terms. Certainly, a first component can be a second component unless stated to the contrary.

Throughout, each element may be singular or plural, unless stated to the contrary. A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Throughout, the terms "A and/or B" as used herein can denote A, B or A and B, and the terms "C to D" can denote C or greater and D or less, unless stated to the contrary.

Throughout, "upward-downward direction (or a vertical direction)" means an upward-and-downward direction of the electric range that is installed for daily use. "Leftward-rightward direction (or horizontal direction)" means a direction orthogonal to the upward-downward direction, and "frontward-backward direction" means a direction orthogonal to both the upward-downward direction and the leftward-rightward direction. "Both side directions" or "lateral directions" have the same meaning as the leftward-rightward direction. These terms may be used interchangeably herein.

In coordinate axes shown in the drawings, X-axis and X-axis direction may be the front-back direction, and Y-axis and Y-axis direction may be the left-right direction or the horizontal direction. Z-axis and Z-axis direction may be the up-down direction or the vertical direction.

Figure 2:
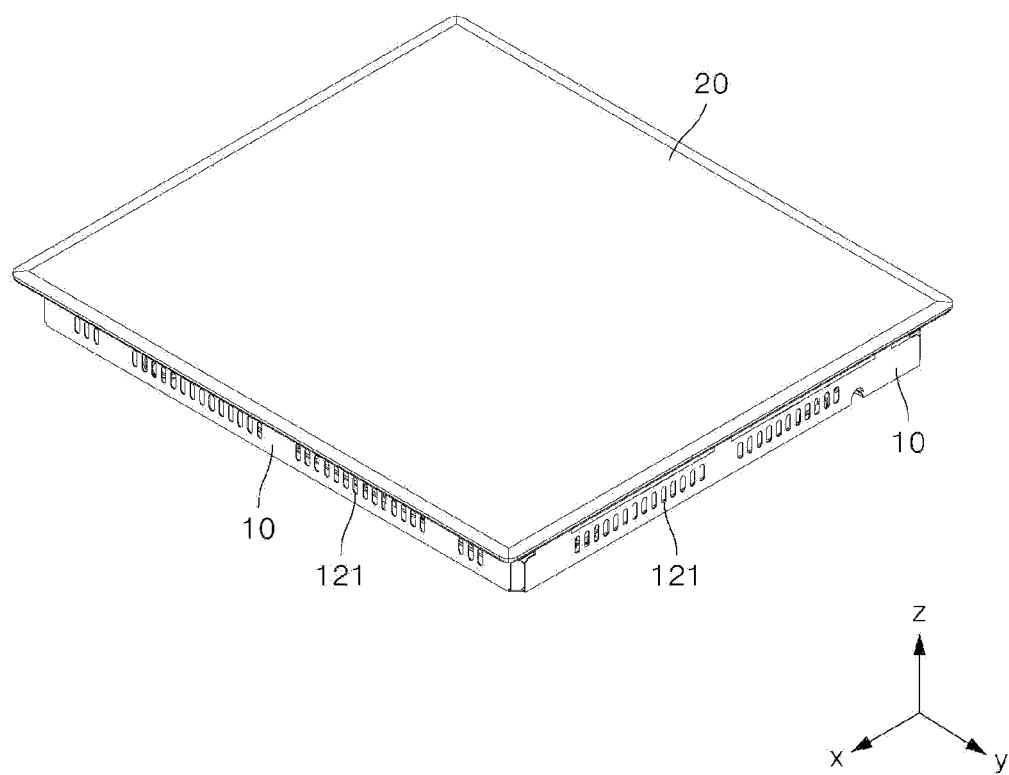
FIG. 2 is a perspective view of an electric range according to an embodiment.
Figure 3:
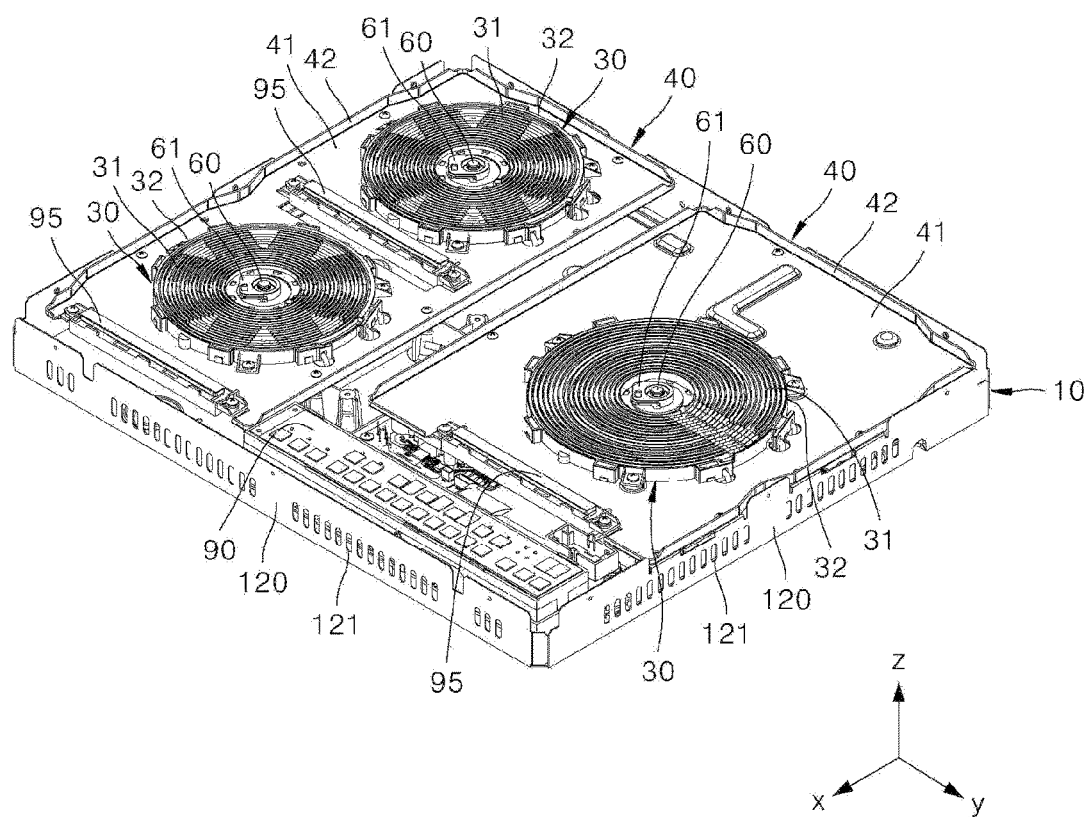
FIG. 3 is a schematic perspective view of an electric range according to an embodiment, some elements omitted therefrom.
Figure 4:
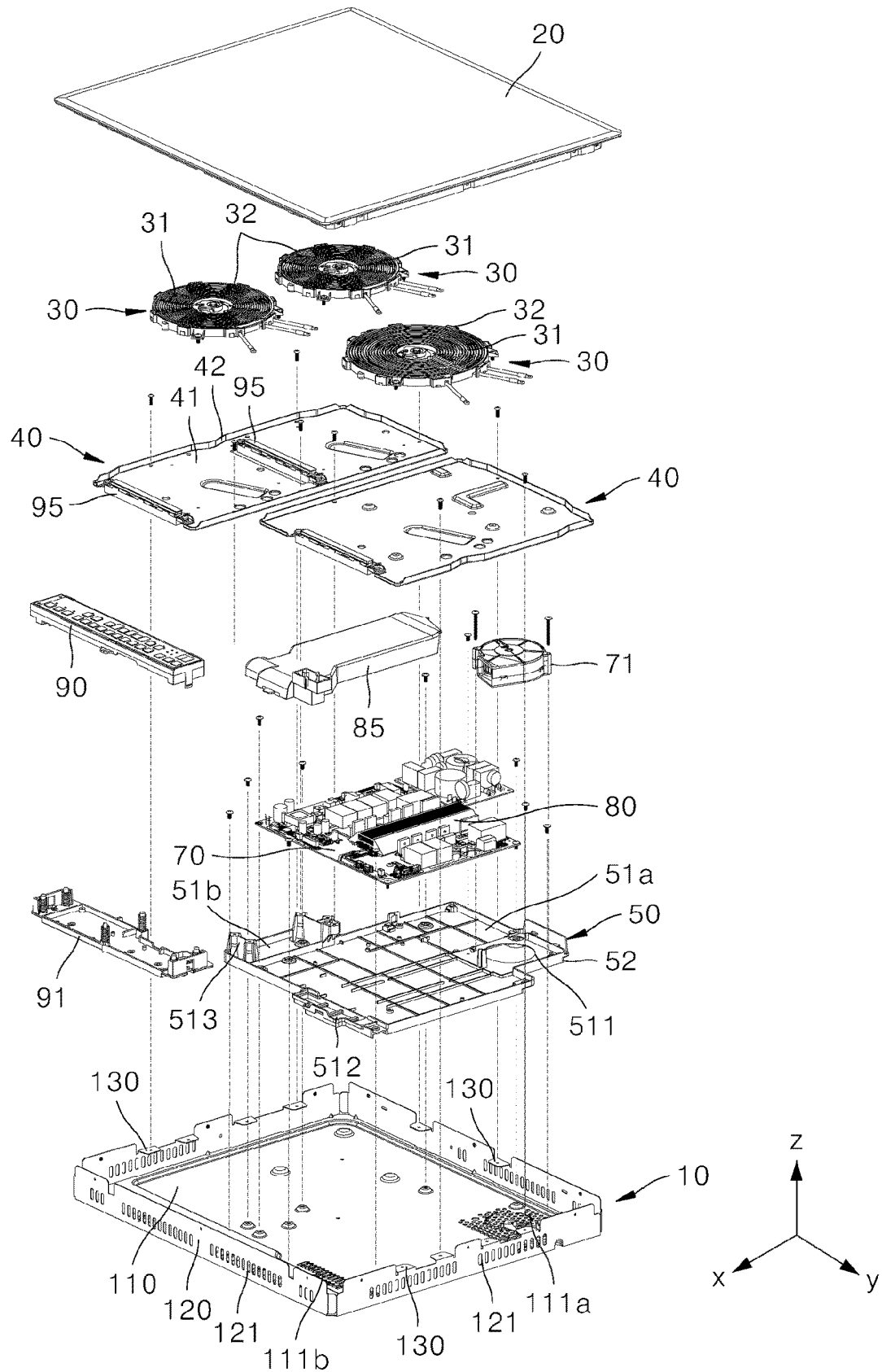
FIG. 4 is an exploded perspective view of an electric range according to an embodiment.
Figure 5:
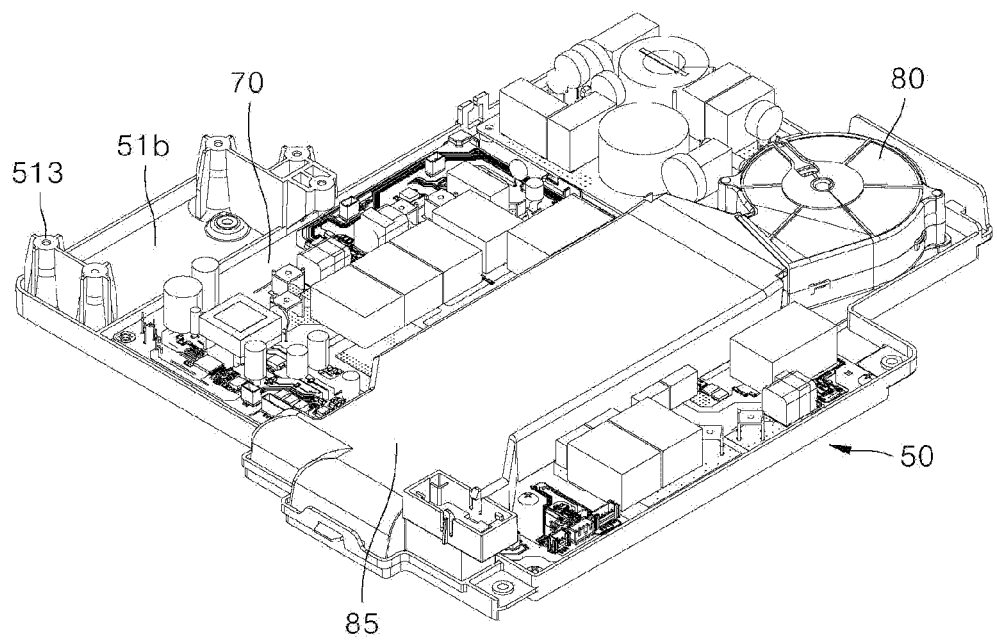
FIG. 5 is a perspective view showing some components of the electric range according to an embodiment.

FIG. 2 is a perspective view of an electric range according to an embodiment. FIG. 3 is a schematic perspective view of an electric range according to an embodiment, some elements omitted therefrom. FIG. 4 is an exploded perspective view of an electric range according to an embodiment. FIG. 5 is a perspective view showing some components of the electric range according to an embodiment.

Referring to FIGS. 2 to 5, the electric range may heat a heating object or object to be heated based on the induction heating method. For example, the heating object may be a tableware containing a metal material, for example, stainless steel or iron.

In the induction heating method, high-frequency power may be applied to a working coil 31 to generate a magnetic field around the working coil 31, and an eddy current generated by the magnetic field may be used in heating a heating object made of a metal material.

More specifically, high-frequency power may be applied to a heating portion (or heating unit or heater) 30 having a structure in which the working coil 31 is disposed adjacent to a ferrite core, so that a magnetic field may be generated around the working coil 31. When a heating object is placed in an area in the generated magnetic field, an eddy current may be induced in the heating object by the magnetic field and Joule's heat may be generated by the eddy current to heat the heating object. As the heating object is heated, the food contained in the heating object may be heated.

The electric range according to an embodiment may include a case, a cover plate 20, the heating portion 30, an upper bracket 40, and a base bracket 50. The case 10 may be configured to protect components composing the electric range. For example, the case 10 may be made of an aluminum material; however, embodiments are not be limited thereto.

The case 10 may be insulated to suppress heat generated by the working coil 31 from being radiated to the outside. The case 10 may accommodate components constituting the electric range, such as the heating portion 30, the upper bracket 40, and a control board 90. A top of the case 10 may be open and the open top may be closed by the cover plate 20. The case 10 may be formed in a box shape by processing a plate-shaped material.

The case 10 may include a first casing 110, a second casing 120, and a third casing 130. The first casing 110 may define a bottom surface of the case 10. The first casing 110 may support internal components disposed in the above-described electric range.

The case 10 may be provided with at least one ventilation hole 111a and 111b. The at least one ventilation hole 111a and 111b may ventilate air so as to facilitate cooling of a printed circuit board (PCB) 70 provided in the first casing 110 and circuit elements or electronic elements disposed on the PCB 70.

The second casing 120 may be bent from the first casing 110 and configured to define a lateral surface of the case 10. The second casing 120 may be bent in a vertical direction at an edge of the first casing 110 to become a side wall of the electric range.

The second casing 120 may be disposed on each side of the first casing 110 formed in a substantially rectangular shape. The second casing 120 may reinforce a rigidity of the entire case 10. More specifically, in order to prevent the plate-shaped first casing 110 from being bent or damaged by a weight of the internal components or an external force, the second casing 120 may be bent from the first casing 110.

The second casing 120 may further include a plurality of air outlet holes 121 formed in a slit shape. The air outlet holes 121 may facilitate communication between an inside and outside of the case 10. Accordingly, air may flow through the air outlet holes 121 to cool the components disposed in the case 10.

The third casing 130 may be bent from the second case 120. The third casing 130 may support the upper bracket 40 together with a boss 513, which will be described hereinafter. The third casing 130 may be provided on at least one side of the first casing 110.

A first upper plate 41 may be seated on an upper surface of the third casing 130, and may define a bottom surface of the upper bracket 40. The first upper plate 41 and the third casing 130 may be coupled to each other by a coupling member, for example, a bolt.

The cover plate 20 may be secured to an upper end of the case 10 and a heating object may be disposed on the cover plate 20. The cover plate 20 may be configured to close the open top of the case 10 to protect the components provided in the case 10.

A heating object may be placed on the cover plate 20 (or an upper surface of the cover plate 20) and the magnetic field generated in the heating portion 30 may pass through the cover plate 20 to reach the heating object. For example, the cover plate 20 may include ceramic; however, embodiments are not limited thereto.

An input interface configured to receive an input from a user may be provided on an upper surface of the cover plate 20. The input interface may be provided in a specific area of the upper surface of the cover plate and display a specific image. The input interface may be configured to receive a touch input from the user and the electric range may be operated based on the received touch input.

For example, the input interface may be a module configured to allow a user to input a desired heating intensity or a heating time, and may be implemented as a physical button or a touch panel. For example, the input interface may be a Thin Film Transistor Liquid Crystal Display (TFT LCD); however, embodiments are not limited thereto.

A control board 90 may be provided in a lower area of the cover plate 20 to input an operation command to the electric range. The control board 90 may include a plurality of key switches so that the user may input a command to the control board via a key switch to control operation of the electric range. The control board 90 may be disposed on a control board bracket 91 and the control board bracket 91 may be secured to the first casing 110.

An upper surface of the control board 90 may be provided in close contact with a lower surface of the cover plate 20.

In this instance, the control board 90 may be disposed to correspond to the input interface.

The control board 90 and the input interface may be connected to each other in a capacitive touch input method. Accordingly, the user may input a control command to the input interface and the control command may be input to the control board 90.

A display configured to display an operational state of the electric range may be provided in a specific area of an upper surface of the cover plate 20. More specifically, a light display region may be formed on the upper surface of the cover plate 20. A light source unit 95 may be disposed under the cover plate 20 and light emitted from the light source unit 95 may be transmitted to the user through the light display region. The light display region and the light source unit 95 may be disposed at positions corresponding to each other. When a plurality of light source units 95 is provided, a same number of light display regions may be provided on the upper surface of the cover plate 20.

A plurality of heating portions 30 may be provided under the cover plate 20 and configured to heat a heating object. Referring to FIGS. 3 and 4, the electric range may include a first heating portion, a second heating portion, and a third heating portion. The first heating portion 30 may be disposed in a first region, that is, a right region of the electric range, and may be a high-output heating portion. The second and third heating portions 30 may be disposed in a second region, that is, a left region of the electric range, and may be a low-output heating portion. The second and third heating portions 30 may be disposed in the left region of the electric range in the frontward-backward direction, adjacent to each other.

As described above, the heating portion 30 may be implemented in the induction heating method. According to another embodiment, some of the plural heating portions 30 may be implemented in the induction heating method and the other one may be implemented as a resistance heating method. In other words, the electric range according to another embodiment may be implemented as a highlight heating device or hybrid electric range. Hereinafter, embodiments will be described based on an electric range in which all of the heating portions 30 are provided in the induction heating method.

A temperature sensor 60 may be configured to sense a temperature of the cover plate 20. The temperature sensed by the temperature sensor 60 may be used to estimate a temperature of the heating portion 30. The temperature sensor 60 may be provided in a center of the heating portion 30. The temperature sensor 60 may be electrically connected to the printed circuit board 70 provided under the upper bracket 40 through an electric wire.

The electric range may include a sensor bracket 61 configured to secure the temperature sensor 60 to the center of the heating portion 30. The sensor bracket 61 may be secured to the center of the heating portion 30 and the temperature sensor 60 may be secured in the sensor bracket 61.

The heating portion 30 may be coupled to the upper bracket 40. According to an embodiment shown in FIGS. 3 and 4, two upper brackets 40 may be provided in the electric range. One upper bracket 40 provided in the first region of the electric range may support the high-output heating portion 30. The other upper bracket 40 provided in the second region of the electric range may support the low-output heating portion 30.

A number of the heating portions 30 and the upper brackets 40 may not be limited thereto. When the plurality of heating portions 30 is provided, an arbitrary number the upper bracket 40 supporting the heating portion 30 may be also provided as needed.

The heating portion 30 may include the working coil 31 and a core frame 32. A ferrite core may be provided on a lower surface of the core frame 32. The working coil 31 may be spirally wound on an upper surface of the core frame 32. When high-frequency is applied to the working coil 31, a magnetic field may be generated around the ferrite core and the generated magnetic field may form an eddy current in a heating object.

The upper bracket 40 may include an aluminum material, for example; however, embodiments are not limited thereto. The upper bracket 40 may include a first upper plate 41 and a second upper plate 42.

The first upper plate 41 may define a bottom surface of the upper bracket 40 and the heating portion 30 may be secured on the first upper plate 41. The first upper plate 41 may cover the PCB 70 disposed thereunder in the vertical direction. When a plurality of upper brackets 40 is provided, one first upper plate 41 or a plurality of first upper plates 41 coupled to each other may cover the PCB 70 based on an area of the PCB 70.

First upper plate 41 may be configured to shield the electromagnetic field and electromagnetic waves generated by the heating portion 30 from reaching the PCB 70 and the electronic devices disposed on the PCB 70. That is, the upper bracket 40 may be configured to improve electromagnetic compatibility (EMC) and electromagnetic interference (EMI) with respect to the PCB 70.

The second upper plate 42 may be bent from the first upper plate 41. The second upper plate 42 may be bent in the upward-downward direction (or the vertical direction) of the electric range. The second upper plate 42 may be bent from an edge of the first upper plate 41 in the vertical direction. The second upper plate 42 may be disposed on at least one side of the first upper plate 41 formed in a substantially rectangular shape.

The second upper plate 42 may reinforce a rigidity of the entire upper bracket 40. More specifically, in order to prevent the plate-shaped first upper plate 41 from being bent or damaged by a weight of the internal components including the heating portion 30 or an external force, the second upper plate 42 may be bent from the first upper plate 41.

A light source unit 95 may be disposed in the upper bracket 40. For example, the light source unit 95 may be provided on the PCB 70 disposed under the upper bracket 40. An opening may be formed in the upper bracket 40 to correspond to the light source unit 95. As another example, the light source unit 95 may be disposed on the bracket and the light source unit 95 may be electrically connected to the PCB 70 disposed under the bracket.

As described above, the light display region may be formed at a position on the cover plate 20 to correspond to the light source unit 95. The light source unit 95 may include a plurality of LEDs aligned in a line, for example. The light source unit 95 may be luminous when the heating portion 30 is operated, so that the user may be informed of whether the heating portion 30 is operating. Alternatively, the light source unit 95 may change a lighting shape, or color, for example, of the plurality of LEDs to inform the user of an operation state of the electric range.

A number of the light source unit 95 may be properly selected based on a number of the heating portions 30. FIGS. 3 and 4 show that three light source units 95 are provided with respect to three heating portions 30. However, the number of the light source units 95 is not limited thereto.

The base bracket 50 may be referred to as a "second bracket". The base bracket 50 may be disposed under the upper bracket 40 and the PCB 70 may be secured to the base bracket 50.

The base bracket 50 may include a bottom plate 51a and 51b and a side plate 52. The bottom plate 51a and 51b may define a bottom surface of the base bracket 50 and the PCB 70 may be disposed on an upper surface of a first bottom plate 51a. The boss 513 may be formed in a second bottom plate 51b. The boss 513 may support the upper bracket 40 together with the third casing 130 as described above.

The side plate 52 may be bent from the bottom plate 51a and 51b. The side plate 51 may be bent in the vertical direction of the electric range. The side plate 52 may be disposed in each side of the bottom plate 51 formed in a substantially rectangular shape.

The side plate 52 may be configured to reinforce a rigidity of the entire base bracket 50. In other words, the side plate 52 may be bent from the bottom plate 51 to suppress the plate-shaped bottom plate 51 from being curved or damaged by the weight of the internal components, such as the PCB, or an external force.

The PCB 70 may constitute a controller, and may receive power from an external power source. The PCB 70 may be configured to communicate with an external device via wire or wirelessly.

The PCB 70 may be electrically connected to the control board 90, and may receive a command input by the user from the control board 90. The PCB 70 may be electrically connected with the light source unit 95 and the working coil 31 to control operations thereof.

A plurality of electronic elements may be provided on the PCB 70. The plurality of electronic elements may constitute a drive circuit. The drive circuit may be configured to drive the heating portion 30.

A heat sink 71 may be disposed on the PCB 70. The heat sink 71 may be configured to cool heat inside of the case 10, especially, heat generated by some electronic elements disposed on the PCB 70. The heat sink 71 may protect the internal components inside of the case 10.

At least one heat dissipation member may be formed in the heat sink 71. Cooling efficiency may be improved by the at least one dissipation member.

A blower fan 80 may be mounted to the base bracket 50 and configured to blow external air into the case 10 so as to cool the case 10. Referring to FIG. 4, a first through-hole 511 may be formed in a predetermined area of the base bracket 50, for example, a rear area, and the blower fan 80 may be disposed above the first through-hole 511. The first through-hole 511 may be disposed above a first ventilation hole 111a. Accordingly, external air may be drawn into the blower fan 80 via the first through-hole 511 and the air drawn into the blower fan 80 may be forcedly blown at an outlet hole of the blower fan 80 to be discharged.

The air provided by the blower fan 80 may flow toward the PCB 70. The blower fan 80 may be spaced a predetermined distance apart from the heat sink 71, and a portion of the air discharged from the blower fan 80 may be provided to the heat sink 71 and the remaining portion of the air discharged therefrom may be provided to an external area of the heat sink 71.

An air guide 85 may be configured to guide the air discharged from the blower fan 80. The air guide 85 may be mounted on the PCB 70 to surround the heat sink 71. Accordingly, the air guide 85 may transfer the air discharged from the blower fan 80 to the heat sink 71.

A first side, for example, a rear side, of the air guide 85 may be connected to the outlet hole of the blower fan 80 and a second side, for example, a front side, of the air guide 85 may be connected to a front portion of the base bracket 50. A second through-hole 512 may be formed in the front portion of the base bracket 50 and the second through-hole 512 may be disposed above a second ventilation hole 111b. Accordingly, the air having cooled the heat sink 71 may flow toward a second side of the air guide 85, and may be discharged outside of the case 10 via the second through-hole 512 and the second ventilation hole 111b.

Hereinafter, referring to FIGS. 6 to 8, a specific shape of the first casing 110 will be described.

For ease of description, "the first casing 110" is referred to as "the lower casing 110", "the second casing 120" as "the lateral casing 120" and "the third casing 130" as "the seating casing 130".

Figure 6:
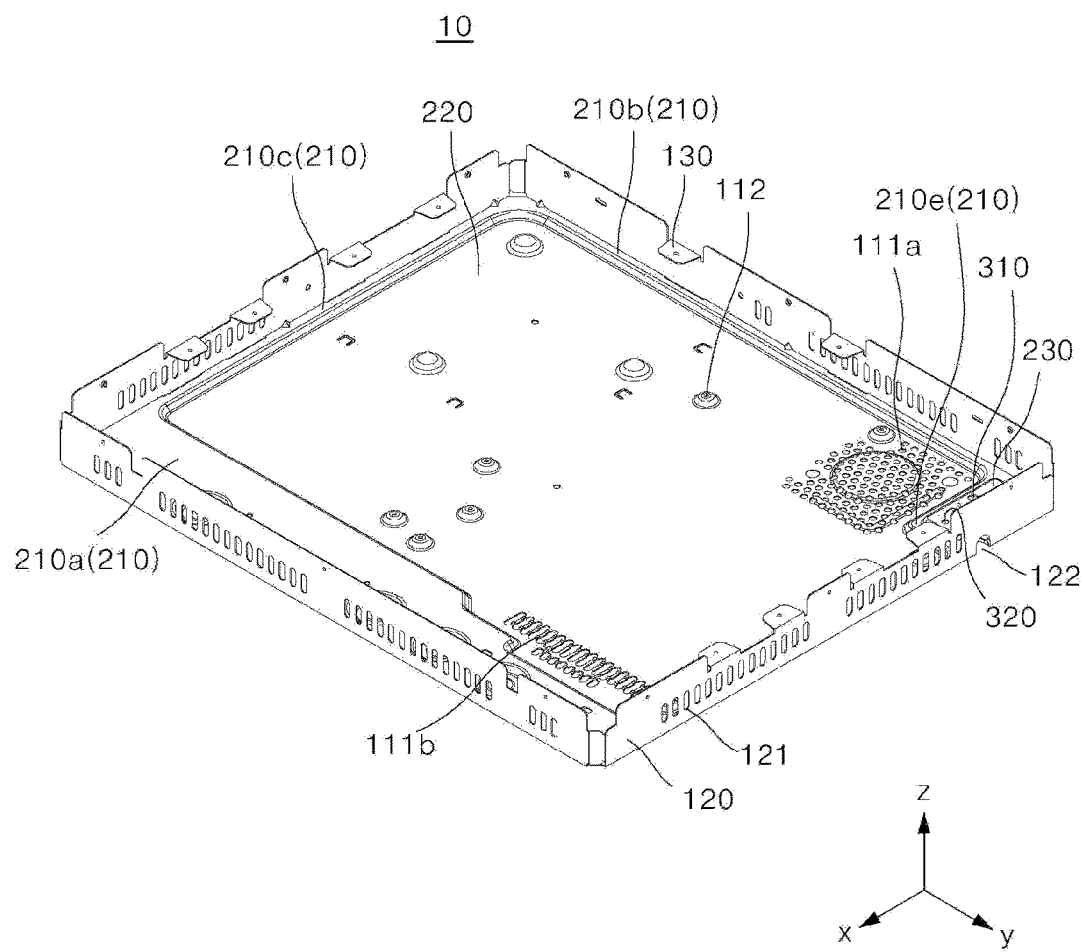
FIG. 6 is a perspective view of a case according to an embodiment, viewed from the top.

FIG. 6 is a perspective view of the case 10 according to an embodiment, viewed from the top. FIG. 7 is a perspective view of the case 10 according to an embodiment, viewed from the bottom. FIG. 8 is a plane view of the case 10 according to an embodiment. FIG. 9 is a cross-sectional view, taken along line IX-IX' of FIG. 8.

Figure 7:
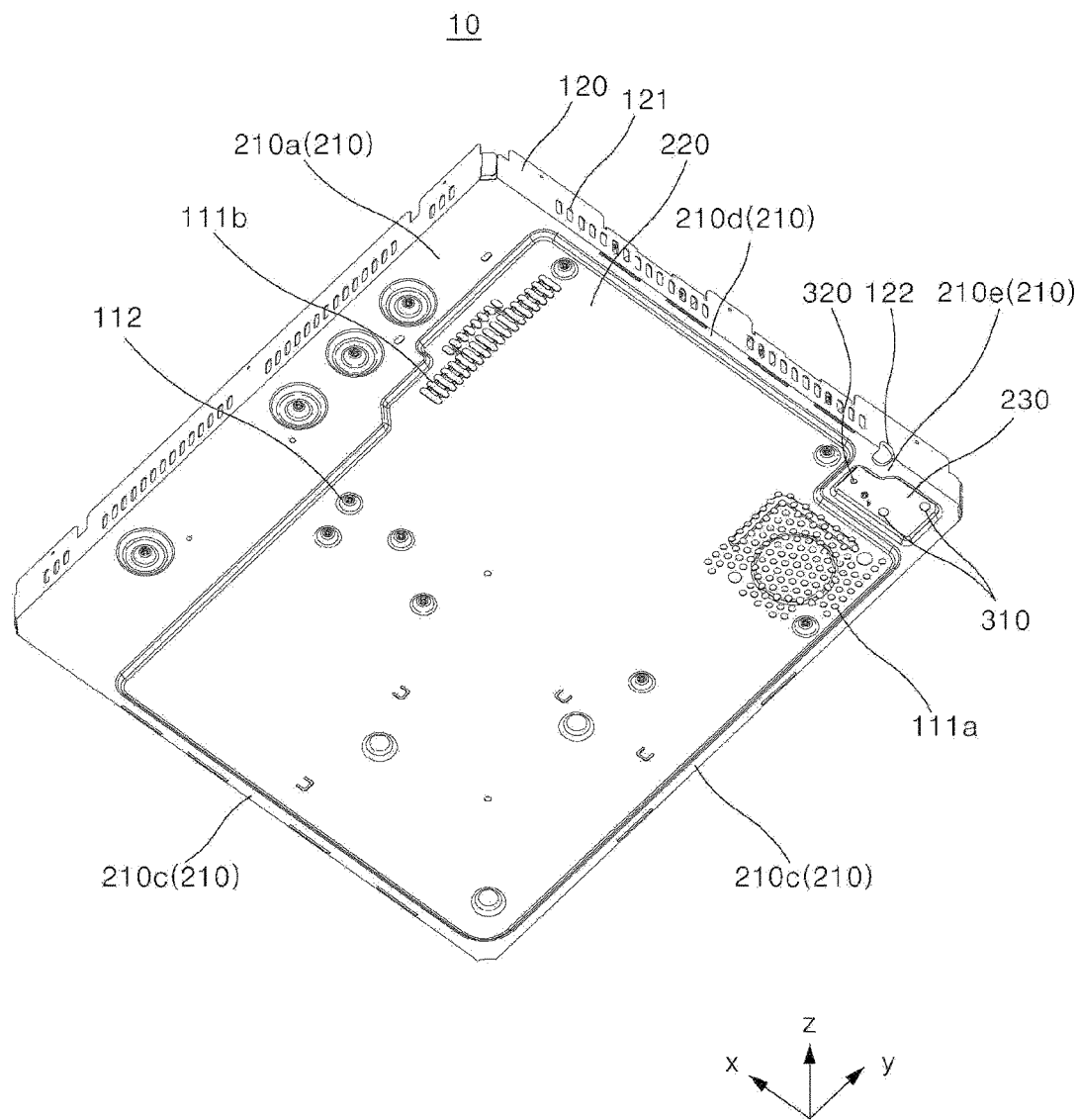
FIG. 7 is a perspective view of a case according to an embodiment, viewed from the bottom.
Figure 8:
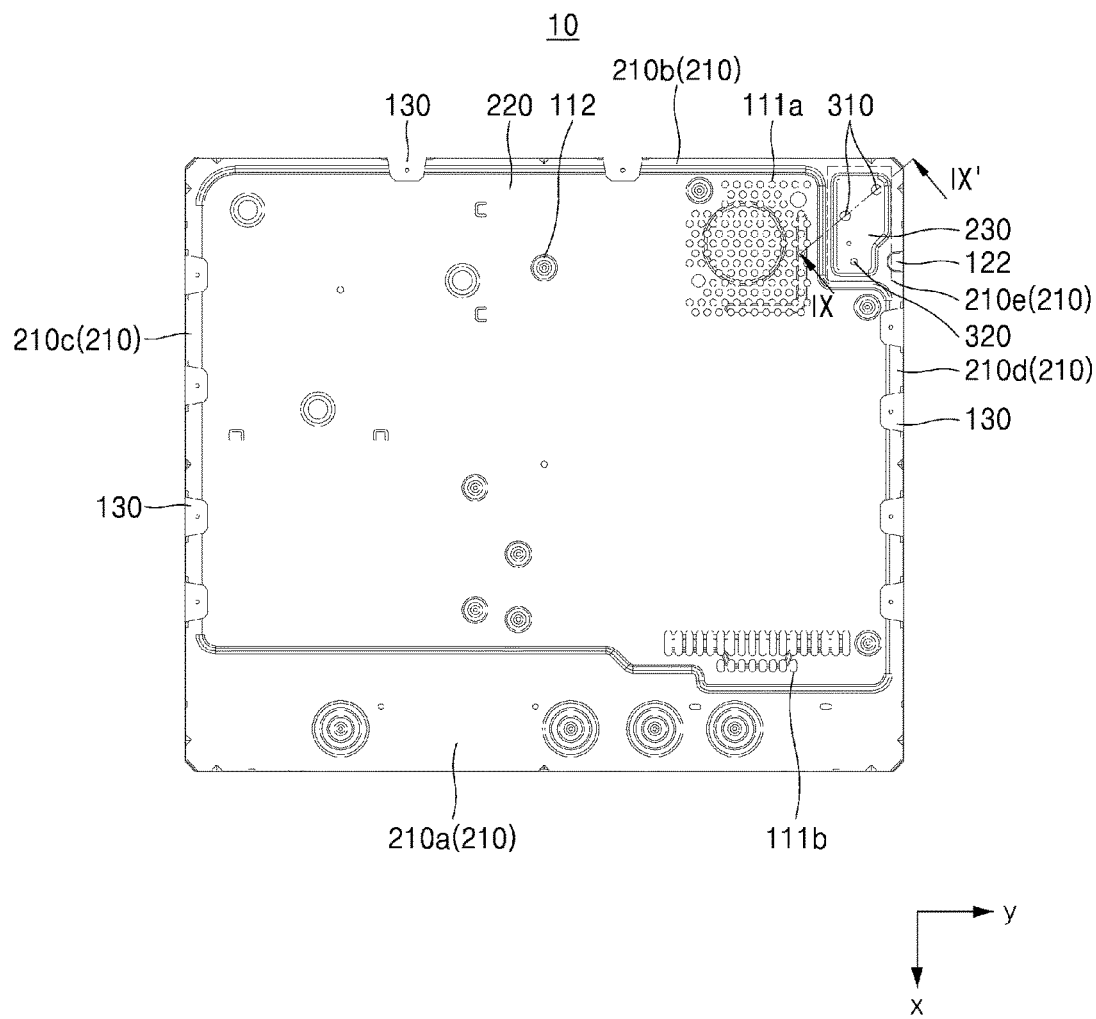
FIG. 8 is a plane view of a case according to an embodiment.
Figure 9:
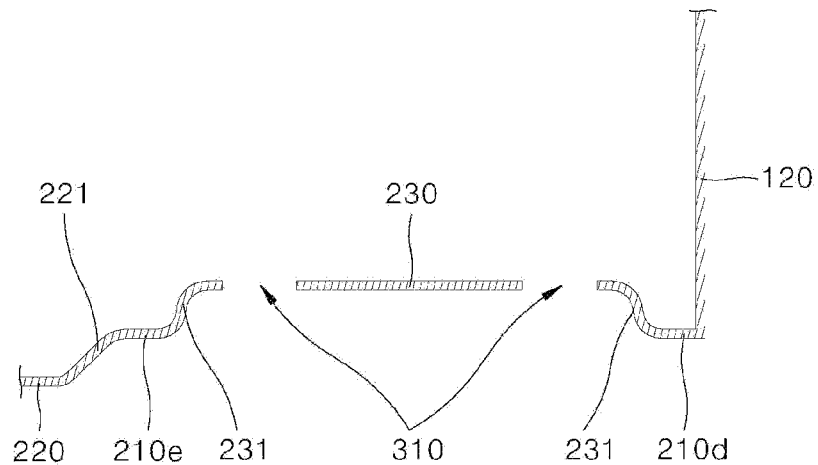
FIG. 9 is a sectional view, along line IX-IX' of FIG. 8.

Referring to FIGS. 6 to 8, the case 10 may include the lower casing 110, the lateral casing 120, and the seating casing 130. The lower casing 110 may define a bottom surface of the case 10. The lateral casing 120 may be bent from the first casing 110 and define a lateral surface of the case 10. The seating casing 130 may be bent from the second casing and support the upper bracket 40.

The lower casing 110 may include a first lower part 210, a second lower part 220, and a third lower part 230. The first, second, and third lower parts 210, 220 and 230 may be integrally formed with each other as one body.

The first lower part 210 may include a first portion 210a, 210b, 210b, 210c, and 210d, and a second portion 210e. The first portion 210a, 210b, 210c, and 210d of the first lower part 210 may be integrally formed with the second portion 210e.

Referring to FIG. 9, the first portion 210a, 210b, 210c, and 210d of the first lower part 210 may have a same height as the second portion 210e of the first lower part 210 with respect to the second lower part 220. The first portion 210a, 210b, 210c, and 210d of the first lower part 210 may be formed along an edge area of the case 10.

More specifically, the first portion 210a, 210b, 210c, and 210d of the first lower part 210 may include front region 210a, rear region 210b, left region 210c, and right region 210d. The front region 210a of the first lower part 210 may be formed along a front edge area of the case 10. The rear region 210b of the first lower part 210 may be formed along a rear edge area of the case 10. The left region 210c of the first lower part 210 may be formed along a left edge area of the case 10. The right region 210d of the first lower part 210 may be formed along a right edge area of the case 10.

The front region 210a of the first lower part 210 may be formed wider than the rear, left, and right regions 210b, 210c and 210d of the first lower part 210. In other words, the control board 90 and the control board bracket 91 may be mounted on the front region 210a of the first lower part 210 (see FIG. 4). For this purpose, the front region 210a of the first lower part 210 may be formed relatively wider.

The second portion 210e of the first lower part 210 may be formed at one corner of the case 10. More specifically, the second portion 210e of the first lower part 210 may be formed at a connection area between a first edge and a second edge of the case 10. The second portion 210e of the first lower part 210 may be connected to the first portion 210a, 210b, 210c, and 210d of the first lower part 210.

For example, referring to FIGS. 6 to 8, the second portion 210e of the first lower part 210 may be formed at a connection area between a rear edge (the first edge) of the case 10 and a right edge (the second edge) of the case 10. The second portion 210e of the first lower part 210 may be connected to the rear region 210b and the right region 210d of the first lower part 210. The second portion 210e, the right region 210b, and the right region 210d of the first lower part 210 may be integrally formed and have a same height.

The second portion 210e of the first lower part 210 may be formed in a rectangular shape. That is, each side of the second portion 210e of the first lower part 210 may be formed parallel to each corresponding side of the case 10.

The second lower part 220 may be recessed from an inner surface of the first lower part 20. More specifically, the second lower part 220 may be downwardly formed inside of the first lower part 210. For example, the second lower part 220 may be formed by extruding from an upper portion of the first lower part 210. The second lower part 220 may be formed in a substantially rectangular shape.

The second lower part 220 may be lower than the first lower part 210. More specifically, the second lower part 220 may be spaced downward a predetermined distance from the first lower part 210. Accordingly, the second lower part 220 may be an actual bottom surface of the electric range.

The second lower part 220 may be in contact with the front region 210a of the first lower part 210, some of the rear region 210b of the first lower part 210, the front region 210a of the first lower part 210, some of the left region 210d of the first lower part 210, and left and right sides of the second portion 210e of the first lower part 210. Referring to FIG. 9, an edge 221 of the second lower part 220 may be bent upward. The bent edge 221 of the second lower part 220 may be connected to the first lower part 210. Accordingly, the second lower part 220 may be recessed from an inside of the first lower part 210.

Referring to FIG. 4, the base bracket 50 on which the PCB 70 is disposed may be mounted on the second lower part 220. To mount the base bracket 50, at least one connection boss 112 that supports the base bracket 50 may be provided in the second lower part 220. The base bracket 50 may be coupled to the at least one connection boss 112 by, for example, a screw.

At least one ventilation hole 111a and 111b may be formed in the second lower part 220. The first ventilation hole 111a may be formed in a rear right portion of the second lower part 220 and the second ventilation hole 111b may be formed in a front right portion of the second lower part 220.

The third lower part 230 may protrude from a predetermined area of the second portion 210e of the first lower part 210. In other words, the third lower part 230 may be formed upward from a predetermined area of the second portion 210e. For example, the third lower part 230 may be formed by extruding from a lower portion of the first lower part 210.

The third lower part 230 may be formed in a substantially rectangular shape. The third lower part 230 may be higher than the first lower part 210. More specifically, the third lower part 230 may be spaced a preset or predetermined distance upwardly apart, compared with the first lower part 210. An upper surface of the third lower part 230 may be higher than an upper surface of the second portion 210e of the first lower part 210. A lower surface of the third lower part 230 may be higher than the height of a lower surface of the second portion 210e.

Referring to FIG. 9, an edge 231 of the third lower part 230 may be bent downward. The bent edge 231 of the third lower part 230 may be connected to the first lower part 210. Accordingly, the third lower part 230 may protrude from the second portion 210e of the first lower part 210.

Referring to FIG. 9 again, the third lower part 230 may protrude from a predetermined area of the second portion 210e of the first lower part 210. The predetermined area of the second portion 210e may be disposed between the downward-formed second lower part 220 and the upward-formed third lower part 230.

FIGS. 6 to 9 show that the third lower part 230 protrudes from the predetermined area of the second portion 210e provided in the first lower part 210. According to another embodiment, the third lower part 230 may protrude from all of the second portion 210e provided in the first lower part 210. Hereinafter, an embodiment will be described under assumption that the third lower part 230 protrudes from the predetermined area of the second portion 210e of the first lower part 210.

A wire connection hole 122 for a power supply wire for supplying external power to the PCB 70 may be formed in the casing 10. The wire connection hole 122 may be formed at one corner of the case 10 in which the second portion 210e of the first lower part 210 is disposed. The electric power supply wire may pass through the wire connection hole 122.

The third lower part 230 may also be formed in the second portion 210e of the first lower part 210. After passing through the wire connection hole 122, the electric power supply wire might interfere with the third lower part 230. Accordingly, the third lower part 230 may have a shape that will not interfere with the connection hole 122 formed in the one corner of the case 10.

Referring to FIGS. 6 to 8, the third lower part 230 may be formed in the second portion 210e of the first lower case 210 so as to have a substantially rectangular shape. To avoid the area where the wire connection hole 122 is formed, a predetermined area of the third lower part 230 may be formed in a concave shape. With this structure, interference between the third lower part 230 and the electric power supply wire may be prevented.

A first coupling hole 310 and a second coupling hole 320 may be formed through the third lower part 230. The first and second coupling holes 310 and 320 may be formed in the third lower part 230 to couple components for securing and guiding the electric power supply wire.

Hereinafter, the case 10 in which components for securing the electric power supply wire are secured will be described.

Figure 10:
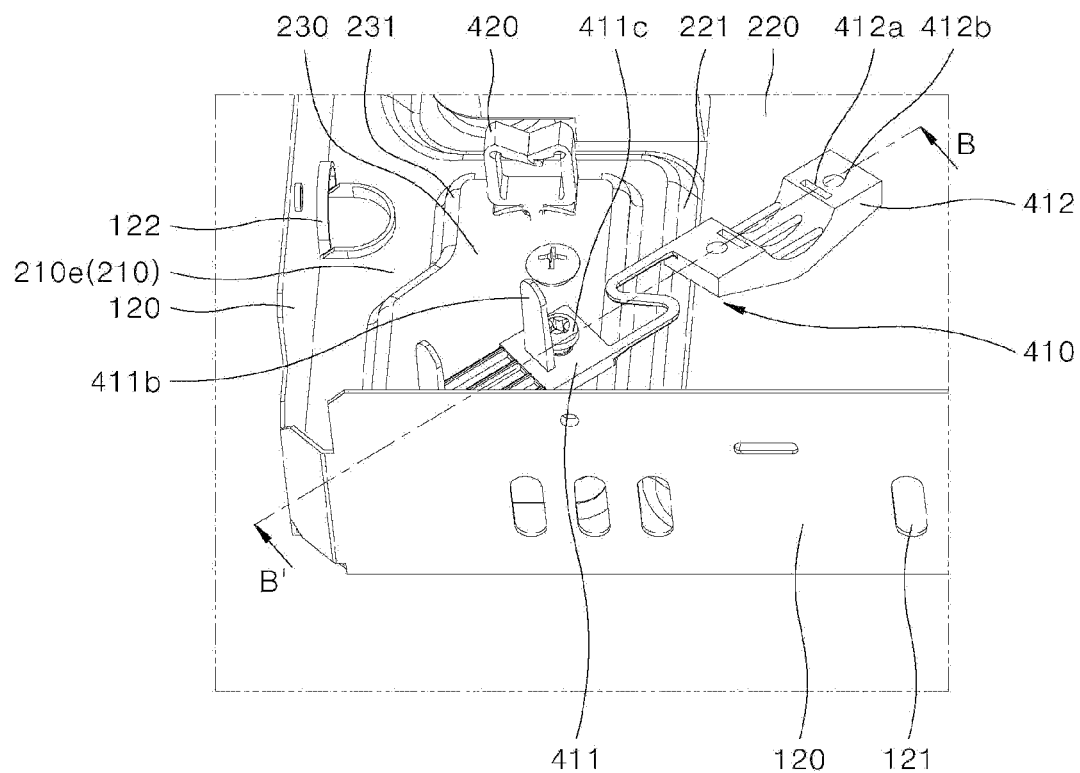
FIG. 10 is a perspective view of a case in which a securing component for securing an electric power supply wire is disposed, viewed from the top.
Figure 11:
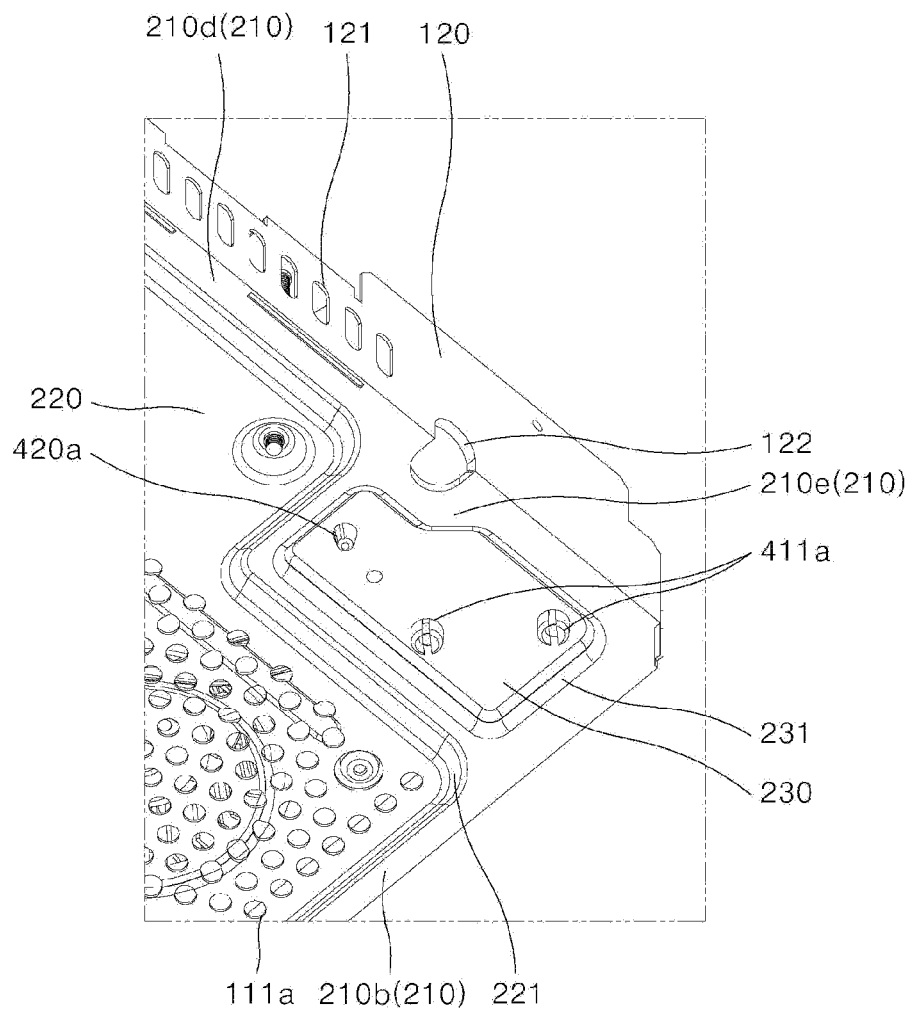
FIG. 11 is a perspective view a case in which a securing component for securing an electric power supply wire is disposed, viewed from the bottom.
Figure 12:
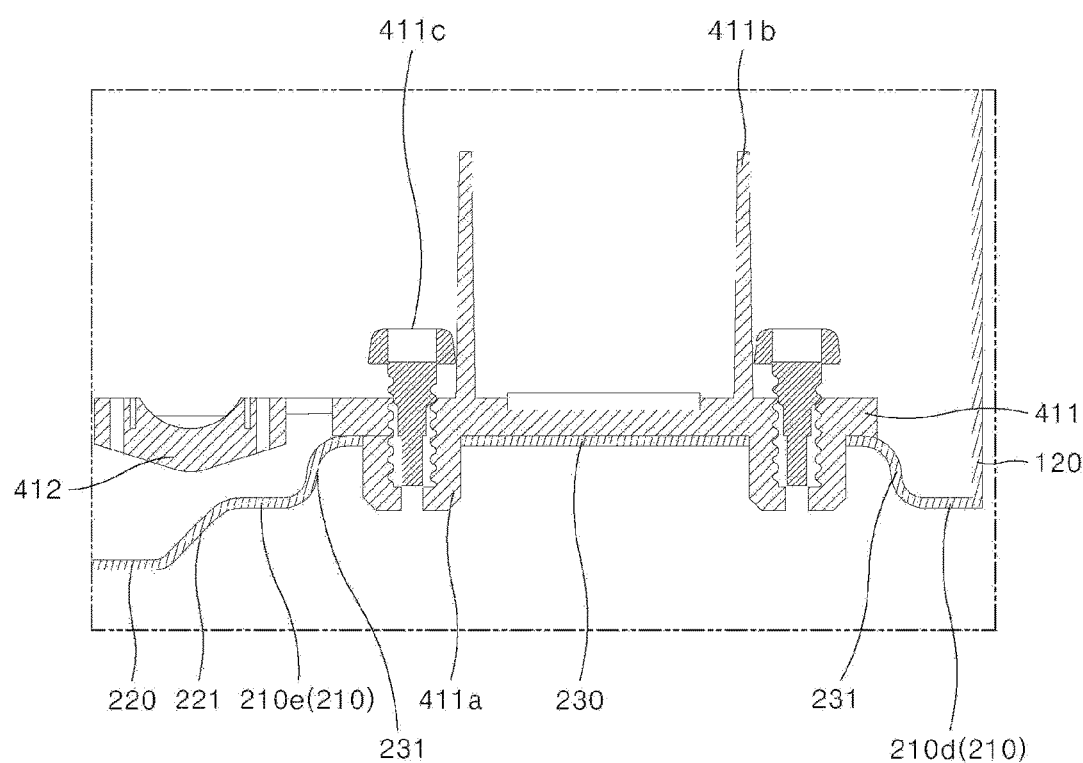
FIG. 12 is a cross-sectional view, taken along line XII-XII' of FIG. 10.

FIG. 10 is a perspective view of a case in which a securing component for securing an electric power supply wire is disposed, viewed from the top. FIG. 11 is a perspective view of a case in which a securing component for securing an electric power supply wire is disposed, viewed from the bottom. FIG. 12 is a cross-sectional view, taken along line XII-XII' of FIG. 10.

Referring to FIGS. 10 to 12, a wire securing portion 410 and a wire guide 420 may be disposed in the third lower part 230 formed in the second portion 210e of the first lower part 210. The wire securing portion 410 may be configured to secure the electric power supply wire to the lower casing 110. More specifically, the wire securing portion 410 may fix the electric power supply wire to the third lower part 230. For example, the wire securing portion 410 may be a wire clamp.

The wire securing portion 410 may include a lower wire securing portion 411 and an upper wire securing portion 412. The lower wire securing portion 411 may be coupled to the third lower part 230. A first connection member 411a may be formed in a lower area of the lower wire securing portion 411. The first connection member 411a may be inserted in the first coupling hole 310 so that the lower wire securing portion 411 may be coupled to the third lower part 230.

A protrusion may be formed in the first connection member 411a and a screw 411c may be inserted into the first connection member 411a. The protrusion formed inside of the first connection member 411a may be engaged with a screw thread and a screw trough of the screw 411c, so that the first connection member 411a may be screw-coupled to the third lower case 230.

A second connection member 411b may be formed in an upper area of the lower wire securing portion 411. The second connection member 411b may protrude from the upper area of the lower wire securing portion 411.

A first hole 412a corresponding to the second connection member 411b and a second hole 142b corresponding to a head of the screw 411c may be formed in the upper wire securing portion 412. The upper wire securing portion 412 may be coupled to the upper area of the lower wire securing portion 411 by an external force applied by a user.

More specifically, the electric power supply wire may be disposed through the wire connection hole 122. The electric power supply wire disposed in the case 10 may be positioned in a center of the lower wire securing portion 411. After that, the second connection member 411b of the lower wire securing portion 411 may be inserted into the first hole 412a of the upper wire securing portion 412. Accordingly, the upper wire securing portion 412 and the lower wire securing portion 411 may be coupled to each other so that the electric power supply wire may be secured between the upper wire securing portion 412 and the lower wire securing portion 411.

In other words, the first connection member 411a may protrude from the lower area of the wire securing portion 411, and may be disposed through the third lower part 230. The third lower part 230 may be higher than the first connection member 411a, to be upwardly spaced apart with respect to the height of the first lower part 210.

The wire guide 420 may be configured to guide arrangement of the electric power supply wire. More specifically, some space may be formed in the wire guide 420 and the electric power supply wire may pass through the inner space of the wire guide 420.

A third connection member 420a may be formed in a lower area of the wire guide 420. The third connection member 420a may be inserted into a second coupling hole 320 so that the wire guide 420 may be coupled to the third lower part 230.

Referring to the case 10 and the components provided to secure the electric power supply wire, characteristics of the electric range according to embodiments disclosed herein will be described.

The electric range according to an embodiment may have the lower casing 110 constituting the lower portion of the case 10 that is formed in two steps. More specifically, the lower casing 110 may include the first, second, and third lower parts 210, 220, and 230. The second lower part 220 may be recessed from the first lower part 210, and the third lower part 230 may protrude from the first lower part 210. The base bracket 50 in which the heat sink 71, the plurality of electronic elements, and the PCB 70, for example, are disposed may be secured to the second lower part 220. The components configured to secure the electric power supply wire may be mounted to the third lower part 230.

The second lower part 220 may be recessed and a distance (height) between the cover plate 20 and the second lower part 220 may be increased, compared with the conventional electric range. Accordingly, it may be possible to secure a wide internal space of the case 10 to dispose the internal components of the electric range. In addition, it may be possible to form a slim electric range by securing the wide internal space of the case 10.

Further, the edge 221 of the second lower part 220 may be upwardly bent to be connected to the first lower part 210. The edge 231 of the third lower part 230 may be downwardly bent to be connected to the first lower part. Accordingly, the bent edges 221 and 231 may reinforce the rigidity of the lower casing 110 and reduce downward deflection of the case 10.

Still further, the wire securing portion 411 may be coupled to the third lower part 230. The third lower part 230 may be upwardly spaced a preset or predetermined distance apart with respect to the first lower part 210. The preset distance may be greater than or equal to the height of the first connection member 411a formed in the lower area of the wire securing portion 411. Accordingly, a lower surface of the first connection member 411a may be prevented from contacting with an upper surface, that is, a bottom surface, of an object seating the electric range thereon, when the first connection member 411a penetrates to be coupled to the third lower case 230. In addition, the electric range may be seated on the object stably.

Still further, due to the structural change, the electric range according to an embodiment may not use the component for spacing the wire securing portion 411 upwardly apart from the lower casing 110. Accordingly, the manufacturing costs of the electric range may be reduced.

Embodiments disclosed herein provide an electric range that may secure a wide internal space of a case enough to install internal components. Embodiments disclosed herein further provide an electric range that may prevent downward sag of a case caused by installation of internal components and reinforce the strength of the case. Embodiments disclosed herein furthermore provide an electric range that may prevent a lower surface of the component from contacting a bottom of the case, when a component configured to fixing an electric power supply wire is penetrated and secured to a case.

Advantages according to embodiments disclosed herein are not limited to the above advantages, and other advantages that are not mentioned above may be clearly understood from the description and may be more clearly understood from the embodiments set forth herein.

Embodiments disclosed herein provide an electric range including a lower casing defining a lower portion of a case that is formed in two steps. More specifically, the lower casing may include a first lower part, a second lower part, and a third lower part. The second lower part may be recessed from an inside of the first lower part, the lower casing to which the second bracket is coupled, and the third lower part may protrude from at least a predetermined area of the second portion of the first lower part. Accordingly, a wide internal space for installing internal components may be secured in the case.

An edge of the second lower part may be bent upward to be connected to the first lower part. An edge of the third lower part may be bent downward to be connected to the first lower part.

A wire securing portion may be coupled to the third lower part. The third lower part may be upwardly spaced a preset or predetermined distance apart with respect to the first lower part. Accordingly, a lower surface of the first connection member may be prevented from contacting with an upper surface of an object seating the electric range thereon.

An electric range according to an embodiment may include a case including a lower casing corresponding to a bottom surface of the electric range; a cover plate coupled to an upper end of the case; a plurality of heating portions (heaters) arranged under the cover plate; a first bracket arranged under the plurality of heating portions; and a second bracket disposed under the first bracket, the second bracket on which a printed circuit board is mounted. The lower casing may include a first lower part including a first portion formed along an edge of the case and a second portion formed at one corner of the case; a second lower part recessed from an inside of the first lower part; and a third lower part that protrudes from at least a predetermined area of the second portion of the first lower part.

An edge of the second lower part may be bent upward to be connected to the first lower part. An edge of the third lower part may be bent downward to be connected to the first lower part. The second portion of the first lower part may be formed in a connection area between the first edge and the second edge of the case, and connected to the first portion of the first lower part formed along the first and second edges of the case.

A predetermined area of the second portion of the first lower part may be disposed between the second lower part and the third lower part. The third lower part may be formed in at least predetermined area of the second portion of the first lower part not to interfere with a connection hole formed at one corner of the case.

The third lower part may be upwardly spaced a preset or predetermined distance apart with respect to the first lower part. The second lower part may be extruded from an upper area of the first lower part, and the third lower part may be extruded from a lower area of the first lower part.

The electric range may further include a wire for electric power supply configured to supply an external power source to the printed circuit board, and a wire securing portion configured to secure the wire to the lower casing. The second bracket may be coupled to the second lower part, and the wire securing portion may be coupled to the third lower part.

An electric range according to another embodiment may include a case including a lower casing forming a bottom surface of the electric range; a cover plate coupled to an upper end of the case; a plurality of heating portions (heaters) arranged under the cover plate; a first bracket arranged under the plurality of heating portions; a second bracket disposed under the first bracket, the second bracket on which a printed circuit board is mounted; a wire for electric power supply configured to connect an external power source to the printed circuit board; and a wire securing portion configured to secure the wire to the lower casing. The lower casing may include a first lower part; a second lower part recessed from an inside of the first lower part, the lower casing to which the second bracket is coupled; and a third lower part that protrudes from at least a predetermined area of the second portion of the first lower part.

According to embodiments disclosed herein, the electric range including the lower casing that is formed in two steps and a wide internal space of the case may be secured, thereby realizing a slim electric range. Further, the two step forming structure of the lower case may reinforce a rigidity of the lower casing, thereby reducing downward deflection of the case.

The lower area of the screw coupling the third lower part and the wire securing portion to each other may be prevented from contacting with an upper surface of the object seating the electric range thereon. Accordingly, the electric range may be seated on the object stably.

Due to the structural change, the electric range according to embodiments disclosed herein may not use any connection member for coupling the wire securing portion. Accordingly, manufacturing costs of the electric range may be reduced.

Embodiments are described above with reference to a number of illustrative embodiments thereof. However, the embodiments are not intended to limit the embodiments and drawings set forth herein, and numerous other modifications and embodiments can be devised by one skilled in the art. Further, the effects and predictable effects based on the configurations in the disclosure are to be included within the range though not explicitly described in the description of the embodiments.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electric range, comprising:
    a case comprising a lower casing corresponding to a bottom surface of the electric range;
    a cover plate coupled to an upper end of the case;
    a plurality of heaters arranged under the cover plate;
    a first bracket disposed under the plurality of heaters;
    a second bracket disposed under the first bracket, and on which a printed circuit board is mounted, wherein the lower casing comprises:
        a first lower part comprising a first portion formed along an edge of the case and a second portion formed at one corner of the case;
        a second lower part recessed from an inside of the first lower part; and
        a third lower part that protrudes from at least a predetermined area of the second portion of the first lower part; and
    a wire for electric power supply configured to supply power from an external power source to the printed circuit board; and
    a wire securing portion configured to secure the wire to the lower casing, wherein the second bracket is coupled to the second lower part, and wherein the wire securing portion is coupled to the third lower part.

2. The electric range of claim 1, wherein an edge of the second lower part is bent upward to be connected to the first lower part, and an edge of the third lower part is bent downward to be connected to the first lower part.

3. The electric range of claim 1, wherein the second portion of the first lower part is formed in a connection area between a first edge and a second edge of the case, and connected to the first portion of the first lower part formed along the first and second edges of the case.

4. The electric range of claim 1, wherein a predetermined area of the second portion of the first lower part is disposed between the second lower part and the third lower part.

5. The electric range of claim 1, wherein the third lower part is formed in at least a predetermined area of the second portion of the first lower part not to interfere with a connection hole formed at one corner of the case.

6. The electric range of claim 1, wherein the third lower part is upwardly spaced a predetermined distance apart with respect to the first lower part.

7. The electric range of claim 1, wherein the second lower part is extruded from an upper area of the first lower part, and wherein the third lower part is extruded from a lower area of the first lower part.

8. The electric range of claim 1, wherein the second lower part defines a bottom surface of the electric range.

9. The electric range of claim 1, wherein at least one connection member protrudes from a lower area of the wire securing portion, wherein the at least one connection member is disposed through the third lower part, wherein the third lower part is upwardly spaced a predetermined distance apart with respect to the first lower part, and wherein the predetermined distance is greater than a height of the at least one connection member.

10. The electric range of claim 1, further comprising:
    a control board configured to receive input of an operation command of the electric range, wherein the control board is mounted on the first portion of the first lower part.

11. The electric range of claim 1, wherein at least one connection boss configured to support the second bracket is formed in the second lower part, and wherein the connection boss is screw-coupled to the second bracket.

12. The electric range of claim 1, wherein at least one first coupling hole configured to couple the wire securing portion to the third lower part is formed through the third lower part.

13. The electric range of claim 12, wherein the wire securing portion comprises:
    a lower wire securing portion comprising the at least one connection member coupled to the at least one first coupling hole; and
    an upper wire securing portion coupled to the lower wire securing portion, and wherein the at least one connection member is screw-coupled to the at least one first coupling hole.

14. The electric range of claim 1, further comprising:
    a wire guide configured to guide arrangement of the wire, wherein a second coupling hole configured to couple the wire guide is formed through the third lower part.

15. An electric range, comprising:
    a case comprising a lower casing corresponding to a bottom surface of the electric range;
    a cover plate coupled to an upper end of the case;
    a first bracket arranged under the cover plate;
    a second bracket disposed under the first bracket, and on which a printed circuit board is mounted;
    a wire for electric power supply configured to supply power from an external power source to the printed circuit board; and
    a wire securing portion configured to secure the wire to the lower casing, wherein the lower casing comprises:
        a first lower part;

a second lower part recessed from an inside of the first lower part, wherein the second bracket is coupled to the lower casing; and a third lower part that protrudes from at least a predetermined area of a portion of the first lower part, wherein the second bracket is coupled to the second lower part, and wherein the wire securing portion is coupled to the third lower part.

16. The electric range of claim 15, wherein the at least one connection member protrudes from a lower area of the wire securing portion, wherein the at least one connection member is disposed through the third lower part, wherein the third lower part is upwardly spaced a predetermined distance apart with respect to the first lower part, and wherein the predetermined distance is greater than a height of the at least one connection member.

17. The electric range of claim 14, wherein at least one first coupling hole configured to couple the wire securing portion to the third lower part is formed through the third lower part.

18. An electric range, comprising:
 a case comprising a lower casing corresponding to a bottom surface of the electric range;
 a cover plate coupled to an upper end of the case;
 a plurality of heaters arranged under the cover plate including a working coil;
 a first bracket arranged under the plurality of heaters;
 a second bracket disposed under the first bracket, and on which a printed circuit board is mounted;
 a wire for electric power supply configured to supply power from an external power source to the printed circuit board; and
 a wire securing portion configured to secure the wire to the lower casing, wherein the lower casing comprises:
  a first lower part;
  a second lower part recessed from an inside of the first lower part, wherein the second bracket is coupled to the lower casing; and
  a third lower part that protrudes upward from the first lower part so that the third lower part is spaced upwardly from the first lower part, and wherein the wire securing portion is coupled to an upper surface of the third lower part, wherein the second bracket is coupled to the second lower part, and wherein the wire securing portion is coupled to the third lower part.

\* \* \* \* \*